United States Patent [19]

Sinclair

[11] 4,396,670

[45] Aug. 2, 1983

[54] PROCESS FOR THE PRODUCTION OF MICROCAPSULES

[75] Inventor: Peter Sinclair, Gerrards Cross, England

[73] Assignee: The Wiggins Teape Group Limited, Gateway House, England

[21] Appl. No.: 247,150

[22] Filed: Mar. 24, 1981

[30] Foreign Application Priority Data

Apr. 8, 1980 [GB] United Kingdom ............... 8011461

[51] Int. Cl.³ .......................... B32B 3/26; B017 13/02
[52] U.S. Cl. .................................. 428/321.5; 424/32; 264/4.7
[58] Field of Search ......................... 252/316; 428/307

[56] References Cited

U.S. PATENT DOCUMENTS

| 2,797,201 | 7/1957 | Veatch et al. |
|---|---|---|
| 3,016,308 | 1/1962 | Macaulay |
| 3,137,631 | 6/1964 | Soloway |
| 3,251,386 | 6/1966 | Saeki et al. |
| 3,418,656 | 12/1968 | Vassiliades |
| 3,516,846 | 6/1970 | Matson |
| 3,516,941 | 6/1970 | Matson |
| 3,594,328 | 7/1971 | Schibler |
| 3,607,775 | 0/0000 | Yoshida et al. |
| 3,660,304 | 4/1972 | Matsukawa |
| 3,778,383 | 12/1973 | Schibler et al. |
| 3,779,941 | 12/1973 | Powell |
| 3,886,084 | 5/1975 | Vassiliades |
| 3,993,831 | 11/1976 | Vassiliades |
| 4,000,345 | 12/1976 | Powell |
| 4,001,140 | 1/1977 | Foris et al. |
| 4,087,376 | 5/1978 | Foris et al. |
| 4,089,302 | 5/1978 | Foris et al. |
| 4,100,103 | 7/1978 | Foris et al. |
| 4,105,823 | 7/1978 | Hasler et al. |
| 4,124,526 | 11/1978 | Allart et al. ......................... 252/316 |
| 4,219,604 | 8/1980 | Kakimi et al. ....................... 252/316 |
| 4,221,710 | 9/1980 | Hoshi et al. ......................... 252/316 |

FOREIGN PATENT DOCUMENTS

| 1270408 | of 0000 | United Kingdom |
| 1330737 | of 0000 | United Kingdom |
| 1502440 | of 0000 | United Kingdom |
| 1542058 | of 0000 | United Kingdom |
| 2041319 | of 0000 | United Kingdom |
| 2048206 | of 0000 | United Kingdom |

OTHER PUBLICATIONS

Research Disclosures, vol. 166, pp. 37–38, (1978).

Primary Examiner—Benjamin R. Padgett
Assistant Examiner—M. Morkowitz
Attorney, Agent, or Firm—Burns, Doane, Swecker & Mathis

[57] ABSTRACT

In a process for the production of microcapsules containing a liquid fill material, a dispersion-stabilizing species is produced in an aqueous acidic medium by interaction of a melamine formaldehyde precondensate and a water soluble polymer, neither of which alone is dispersion stabilizing with respect to the liquid fill material, and the precondensate is condensed by acid catalysis to produce a condensate which separates from solution and enwraps the liquid fill material to produce microcapsules.

12 Claims, No Drawings

PROCESS FOR THE PRODUCTION OF MICROCAPSULES

This invention relates to a process for the production of microcapsules by polymerisation of melamine formaldehyde precondensate in an aqueous medium containing dispersed particles of a liquid to be encapsulated.

The present process is particularly, but not exclusively, suitable for making microcapsules for use in pressure-sensitive copying systems. In one such system, usually known as a transfer system, an upper sheet is coated on its lower surface with microcapsules containing an oily solution of at least one colourless colour former, and a lower sheet is coated on its upper surface with a colour developing co-reactant material, for example an acidic clay, a phenolic resin or certain organic acid salts. If more than one copy is required, one or more intermediate sheets are provided, each of which is coated on its lower surface with microcapsules and on its upper surface with acidic material. Pressure exerted on the sheets by writing or typing ruptures the microcapsules, thereby releasing the colour former solution on to the acidic material on the next lower sheet and giving rise to a chemical reaction which develops the colour former and so produces an image.

In another such system, usually known as a self-contained system, microcapsules and colour developing co-reactant material are carried by a single sheet, such that writing or typing pressure causes the microcapsules to rupture and release the colour former solution into contact with the co-reactant material to develop colour and so produce a copy image. The microcapsules and co-reactant material may be present on the sheet in the same or separate layers, or may be present within the sheet, for example as a result of furnish addition in the case of a paper sheet.

Melamine formaldehyde precondensates offer advantages in the production of microcapsules by in situ encapsulation techniques (compared for example with urea formaldehyde pre-condensates), since their high reactivity leads to relatively short reaction times and to efficient utilisation of polymer in the microcapsule walls. They share with urea formaldehyde materials the ability to form highly impermeable walls which will retain a wide range of microcapsule fill materials, including materials with a degree of polar character, such as phthalate and phosphate esters. As with urea formaldehyde materials, encapsulation can be carried out at a much higher solids content than is possible with traditional coacervation techniques for the production of microcapsules. This results in a lower drying load when the microcapsule suspension is coated on to paper, and enables an encapsulation plant of given size to achieve a higher output than is possible with low solids content processes, e.g. coacervation processes.

However, melamine formaldehyde precondensates generally have two major drawbacks if used as wall forming materials in a method of the kind described above. Firstly, they are not normally dispersion-stabilising (and in fact may accelerate coalescence of dispersed droplets). Thus very considerable agitation is necessary to maintain the dispersion, which is expensive in capital equipment and energy consumption. Moreover, the continual tendency of the droplets to coalesce leads to difficulty in obtaining reproducible control of droplet size. Droplet size influences the size of the microcapsules produced, which is one of the factors affecting the functional performance of the microcapsules when used in a product such as pressure-sensitive copying paper. The second major drawback is that as condensation polymerisation takes place, a hydrophobic species is formed which on phase separating from the aqueous solution, tends to deposit in an uncontrolled manner, with the result that the dispersed droplets are not enwrapped satisfactorily. A further problem is that gelling of the whole reaction medium may occur if phase separation is incomplete.

Previous proposals for the utilisation of melamine formaldehyde precondensates in a method of the kind described above have had to take account of these draw-backs. This has led to the use of specially modified precondensates or to the use of the precondensates in combination with other materials. For example, it has been proposed in U.K. Pat. Nos. 1 156 725, 1 301 052 and 1 355 124 to use melamine formaldehyde precondensates which are specially modified to impart surfactant or "tenside" properties to them. The complexity of this special modification is a drawback of these proposals. A further proposal (in U.K. Pat. No. 1 507 739) involves the use of melamine formaldehyde precondensate in combination with urea formaldehyde precondensate and a polymer which becomes cross-linked by the precondensates. Whilst this proposal represents a substantial advance, the use of urea formaldehyde (which is generally less reactive than melamine formaldehyde) results in longer reaction times (under equivalent conditions) than would be needed if melamine formaldehyde was the sole precondensate used.

Yet further proposals (U.S. Pat. No. 4,100,103 and U.K. published patent application No. 2 006 709A) involve the use of melamine formaldehyde polymer precursors in combination with certain very specialised negatively-charged polyelectrolytes, which are themselves dispersion stabilising. Whilst the proposal of U.S. Pat. No. 4,100,103 also represents a significant advance, the limited range of polyelectrolytes which can be used may be a drawback.

It has now been found that the benefits inherent in the use of melamine formaldehyde precondensate as a microcapsule wall-forming material can be realised by using the precondensate in combination with one of a range of water soluble polymers which are not in themselves adequately dispersion stabilising but which can be made to interact with the precondensate so as to modify the tendency of the precondensate to be dispersion-destabilising and to phase separate from solution in an uncontrollable manner. The range of water soluble polymers suitable for this purpose has been found to be quite wide, and includes many commodity-type materials which are widely available from numerous suppliers.

The inventive idea therefore broadly resides in the use of a melamine formaldehyde precondensate and a water soluble polymer in the manner just described.

More particularly, the present invention provides a process for the production of microcapsules containing a liquid fill material, comprising the steps of:

establishing an aqueous medium which is at an acidic pH and which contains both a melamine formaldehyde precondensate condensable at said acidic pH and a polymer with which said precondensate interacts in the absence of any substantial amount of urea formaldehyde precondensate to form a species which imparts dispersion-stabilising properties to the aqueous medium with respect to the liquid fill material, neither said precondensate nor said polymer alone being dispersion-stabilising with respect to the liquid fill material at said acidic pH;

establishing a substantially stable dispersion of liquid fill material in the aqueous medium after formation of said dispersion stabilising species; and condensing said precondensate by acid catalysis after formation of said dispersion to produce a condensate which separates from solution and enwraps the dispersed liquid fill to produce said microcapsules.

The invention also resides in the microcapsules so produced, and in sheet material carrying such microcapsules, for example pressure-sensitive copying paper of the transfer or self-contained type.

The melamine formaldehyde precondensate may if desired be prepared in situ by reaction between melamine and formaldehyde as a preliminary stage of the present process. Normally, however, it is more convenient, and hence preferred, to use one of the many already-prepared precondensate materials which are commercially available. With certain, but not all commercially available precondensates it is necessary to condense the precondensate partially in the presence of the polymer as a preliminary stage of the process before a dispersion-stabilising species can be formed. Partially, condensed precondensates are nevertheless still precondensates in that they will condense further and the expression "precondensate" in this specification embraces a precondensate which has been partially condensed as a preliminary stage of the process.

The mechanism involved in encapsulation by the present method has not been fully elucidated. It is thought that where partial condensation in the presence of the polymer is required to produce the dispersion stabilising species, the precondensate actually reacts with the polymer, but that where a dispersion stabilising species is formed without partial condensation, formation of a complex only may be involved. The term "interacts" in this specification embraces both these possibilities.

It is thought that precondensates which afford a dispersion-stabilising species without the need for preliminary partial condensation have a higher "hydrophobe point" (for example above 90° C.) than those for which preliminary partial condensation is needed (the "hydrophobe point" is the temperature which a 5% aqueous solution of the precondensate starts to phase separate on heating up the solution from cold). The ability of a polymer to interact with a melamine formaldehyde precondensate arises from the presence in the polymer of suitable functional groups. Functional groups with which melamine formaldehyde precondensates wil interact are well known, and include, for example, acid, amide, amine, imine, ester, ether, hydroxyl, urethane, thiol or mercaptan groups. The dissolved polymer used in conjunction with melamine formaldehyde precondensate in the present method preferably has functional groups of at least one of the categories just listed. Numerous such polymers are known and may be used in the present method. It should however be borne in mind that some polymers having such groups are themselves dispersion-stabilising in aqueous solution, and hence their use as the polymer is not within the scope of the present invention. Examples of such polymers, the use of which is not within the scope of the present invention are polyvinyl alcohol, gelatin and maleic anhydride copolymers such as ethylene/maleic anhydride copolymer. Preferred examples of polymers which may be used in the present invention are acrylamide/acrylic acid compolymers; starch or starch derivatives; cellulose derivatives such as carboxymethyl cellulose (CMC) or hydroxyethyl cellulose (HEC); alginates such as sodium alginate, polyurethanes, and polyethylene oxide (although an oxide, this material is thought also to carry reactive hydroxyl groups, particularly terminal hydroxyl groups). Rather more partial condensation of the precondensate in the presence of the polymer has so far been found to be necessary when polyethylene oxide is the polymer than when the polymer is one of the other materials just listed.

The foregoing polymers affect the viscosity of the dispersion to different extents, and thus adjustment of dilution or other conditions may be necessary during the process if a high viscosity dispersion is encountered.

Certain of the polymers quoted above, for example CMC and HEC, may have limited dispersion-stabilising character, in that an agitated dispersion of oil droplets in aqueous CMC or HEC solution will not necessarily separate rapidly into an oily layer and an aqueous layer. However, such dispersions exhibit a marked tendency for droplet coalescence and formation of surface oil pools, and hence are not within the meaning of the term "dispersion stabilising" used herein.

It should also be borne in mind that the conditions in an aqueous medium in which a polymer is in solution (or colloidal dispersion) may affect its dispersion-stabilising properties, if any. For example, a polymer might be dispersion-stabilising in solution in water at room temperature, but might not be dispersion stabilising under different conditions, e.g. a different temperature, a different concentration of polymer and/or fill material, and/or a different acidity.

References elsewhere in this specification to dispersion-stabilising properties refer to those properties under the conditions employed in the encapsulation process concerned. The reactivity of melamine formaldehyde precondensates varies widely. It will be understood however that melamine formaldehyde precondensates for use in the present process should be fairly reactive if the time taken for encapsulation is not to be too long. Methylated melamine formaldehyde precondensates are usually of a suitably reactive nature and are preferred. Mixtures of more than one brand or type of melamine formaldehyde precondensate may be used if desired. The reactivity of melamine formaldehyde precondensates is normally increased by adding formaldehyde and this can be done in the present process if desired.

The melamine formaldehyde precondensate may all be added at the start of the process or some may be added at the start of the process and the remainder after a stable dispersion has been obtained. This allows a degree of independent control of the dispersing and wall forming stages of the encapsulation method, i.e. the first addition of melamine formaldehyde precondensate may be chosen to be the optimum for the dispersion of the droplets to be encapsulated, and the second addition may later supplement the amount added earlier so as to provide the amount needed for adequate wall formation.

The weight ratio of polymer to precondensate to be used in the present process is generally in the range 0.03:5 to 5:1 at the stage of the process at which the dispersion stabilising species is produced, although additional precondensate may be added subsequently if desired. The optimum weight ratio of polymer to precondensate depends on the particular polymer, precondensate and liquid fill material being used, and some routine experimentation may be needed to establish this, Guidance is of course obtainable from the specific Examples set out hereafter.

If too much precondensate relative to polymer is used, it becomes difficult to produce a dispersion stabilising species. If too little precondensate relative to polymer is used, a similar effect may be observed and in addition, an excessively high viscosity may result. The relative amounts of polymer and precondensate used affect the dispersion stabilising properties of the species formed by their interaction and thus by suitable selection of these relative amounts, the dispersion stabilising properties can be matched to the degree of hydrophobic character of the liquid fill to be encapsulated.

The acid used to bring about acid catalysis is not critical, and may conveniently be acetic acid, citric acid, hydrochloric acid or sulphuric acid. The acid may be added after the polymer and the precondensate have been mixed, or may be added to either component (or to both components) before mixing. If acid is added to the precondensate before mixing with the polymer, care must be taken to see that the precondensate has not condensed with itself to so great an extent that on mixing with the polymer, it will not interact with the water-soluble polymer sufficiently to produce a dispersion-stabilising species. The optimum pH for the condensation reaction depends to some extent on the particular precondensate and polymer used, but is generally in the range 3.9 to 5.5. The preferred pH for materials which require a partial condensation step as a preliminary to formation of a dispersion - stabilising species is within the range 3.9 to 4.7, more preferably 4.1 to 4.3. For materials for which no such partial condensation stage is necessary, the preferred pH for the condensation is preferably within the range 4.0 to 5.5, and most preferably is 4.5. Too high a pH will result in a longer reaction time, whereas too low a pH may result in development of the colour of the colour formers in the liquid fill material during the encapsulation process and/or in too rapid reaction and hence may result in over-rapid and uncontrolled deposition of condensed melamine formaldehyde material about the liquid fill material.

Usually, the liquid fill material is added to the aqueous medium after interaction of the precondensate and polymer to produce a dispersion - stabilising species, but this is not essential. Similarly, although adjustment of pH to the desired acidic value is usually carried out before addition of the liquid fill material, it is not essential that this be done. It will be understood that in both these departures from usual practice, there is established during the microencapsulation process an aqueous medium containing a dispersion-stabilising species at a pH at which the precondensate will condense and then a substantially stable dispersion of liquid fill material. If the condensation reaction is found to be proceeding too fast, it may be deliberately slowed down, for example by chilling the reactants, say to 15° C. where partial condensation has been employed as a preliminary stage of the process, or by raising the pH of the reaction mixture (for example by the addition of sodium hydroxide) if partial condensation has not been employed. In the former case, such slowing down has the advantage that the period during which the substantially stable dispersion of liquid fill material can be produced is extended, which facilitates better control of the droplet size of the dispersion where this is a problem, since longer milling is possible. The droplet size influences the size of the microcapsules obtained, and thus the ability to prolong the milling period may assit in obtaining microcapsules of a narrow size distribution. A narrow size distribution promotes uniform performance of products in which microcapsules are used.

A further benefit of the ability to prolong the milling period is that if there is any failure of the equipment in the encapsulation plant, for example in a pump or stirrer, the batch in question need not be discarded, since it is still usable when repairs have been effected, provided of course that the interruption is not too long.

After formation of a stable dispersion, the temperature of the reaction medium is desirably raised, typically to about 55° C., to accelerate the condensation reaction and thus microcapsule wall formation. This is generally complete after two hours reaction at 55° C. (at the preferred pH values quoted above). If a temperature lower than 55° C. is used, microcapsules are still obtained, but a longer reaction time is generally necessary. For example, if reaction is carried out at 45° C., three hours reaction time may be required rather than two. At 30° C., twenty-four hour's reaction may be necessary. Temperatures higher than 55° C. can also be used. If desired, an ammonium salt, e.g. ammonium chloride, may be added to react with any free formaldehyde which may be present and which might otherwise escape into the atmosphere as irritating fumes. When the reaction has proceeded to the desired extent, the pH is preferably raised to 7 or above by the addition of sodium hydroxide (or alternatively potassium hydroxide or other basic materials, for example an organic base such as triethanolamine). This not only substantially prevents further reaction (which might lead to agglomeration on storage of the microcapsules) but also lessens any problem of corrosion of the reaction vessel(s) involved.

The phase ratio employed is not critical, but is generally in the range of 4.5:1 to 20:1, a high phase ratio being used if it is desired to encapsulate at a high solids content (the phase ratio is the weight ratio of liquid fill material droplets to microcapsule wall precursor material in the aqueous solution). If especially thick-walled microcapsules are required, for example for use in the self-contained rather than the transfer type of pressure-sensitive copying system, a low phase ratio may be used.

The liquid material may in principle be any water-immiscible liquid which is substantially inert with respect to water. The expression "water-immiscible liquid" includes not only liquids which are substantially completely immiscible with water but also those which are largely immiscible with water but nevertheless have a slight solubility. Examples of water-immiscible liquids which can be encapsulated are partially hydrogenated terphenyls, chlorinated paraffins, biphenyl derivatives; alkyl naphthalenes, diaryl methane derivatives, dibenzyl benzene derivatives, alkanes, cycloalkanes, and esters such as phthalates, adipates, trimellitates and phosphates. Numerous other water-immiscible liquids are disclosed in the patent literature as being microencapsulated, and these too can be encapsulated by the present method. The encapsulated liquids may contain dissolved colour formers if the microcapsules are for use in pressure-sensitive copying systems. Such colour formers are extensively described in the patent literature, and so will not be discussed extensively herein, but by way of example they may be phthalide derivatives, fluoran derivatives, diphenylamine derivatives, spiropyran derivatives, phthalimidine derivatives and di-thiooxamide derivatives. The present process may take the form of a batch process, as has hitherto generally been conventional in the microencapsulation art, but alternatively it may constitute a continuous process, carried out, for example, in a long pipe.

The invention will now be illustrated by the following Examples (in which all percentages are by weight), Examples I to XX being of a process in which partial condensation is employed as a preliminary stage of theprocess.

In all the examples given mean droplet size was determined by observation through a microscopic equipped with a graticule.

EXAMPLE I 45 g of R1144 copolymer, (an acrylamide/acrylic acid copolymer supplied as a 20% by weight solution by Allied Colloids Ltd., and having a viscosity average molecular weight of about 400,000 and an acrylic acid content of 42% by weight), 40 g of BC 336 methylated melamine formaldehyde precondensate (supplied by British Industrial Plastics Ltd. and having a reactive resin content of about 76% by weight, a solids content of about 71% by weight and a hydrophobe point of about 39° C.), and 278 g deionized water were mixed and the pH of the mixture was lowered to 4.3 by adding acetic acid. The mixture was stirred for 1¾ hours at a temperature of 20° C. to bring about partial condensation of the precondensate after which the mixture was milled with 358.0 g of material to be encapsulated until a mean droplet size of 2μ was reached. The dispersion thus formed was found to be stable and was then stirred at 15° C. for 1 hour.

The material to be encapsulated, which will hereafter be referred to as "internal phase", was a colour former solution containing crystal violet lactone. The solvent for the colour former solution was a 3:1 (w/w) mixture of HB40 and kerosene, the former being a mixture of partially hydrogenated terphenyls sold by Monsanto Limited (HB40 is also known as Santosol 340).

The temperature of the dispersion was then raised to 55° C. using a water bath and the dispersion was stirred for 3 hours at that temperature, after which microcapsules were seen to have formed, and the pH was raised to 10.0. The microcapsule suspension obtained had a solids content of 55% and was subsequently coated on to paper using a laboratory Meyer bar coater. When the sheet was placed on a colour developing sheet and written upon, a clear blue copy was developed on the colour developing sheet.

EXAMPLE II 90 g of R1144 copolymer were diluted with 400 g deionized water and the pH of the mixture was lowered to 4.1 by adding 20% acetic acid. 80 g of BC 336 precondensate were added. The mixture was stirred until it just became turbid, indicating that partial condensation had occurred.

50.0 g of water and 179.0 g of the same internal phase as was used in Example 1 were added to 158.5 g of the turbid mixture just described. The dispersion was milled until a mean droplet size of 4μ was reached. The dispersion was stable.

The dispersion was then stirred for 1 hour at 15° C. The temperature of the dispersion was then raised to 60° C. using a water bath and the dispersion was left stirring for a further 3 hours at that temperature, after which microcapsules were seen to have formed. The pH of the mixture was then raised to 10.0. The microcapsule suspension obtained had a solids content of 51.5% and was subsequently coated on to paper using a laboratory Meyer bar coater. When the sheet was placed on a colour developing sheet and written upon, a clear blue copy was developed on the colour developing sheet.

EXAMPLE III

This example illustrates the addition of a smaller proportion of melamine formaldehyde precondensate than was used in the preceding Examples. This results in prolongation of the period in which it is possible to emulsify the internal phase in the solution.

45 g of R1144 copolymer and 226.5 g of deionized water were mixed and the pH of the mixture was lowered to 4.3 using 15% acetic acid solution, after which 12.5 g of BC336 precondensate were added. The mixture was chilled to 15° C. and then stirred for 2½ hours at that temperature to bring about partial condensation, after which the mixture was milled with 248.5 g of the same internal phase as was used in Example 1 until a mean droplet size of 5μ was reached. The resulting dispersion was stable. 14.0 g of 25% ammonium chloride solution was added to the dispersion, which was then stirred for 1 hour at room temperature.

The temperature of the dispersion was then raised to 55° C. using a water bath and the dispersion was stirred for 2 hours at that temperature, after which microcapsules were seen to have formed. The pH was then raised to 10.0. The microcapsule suspension obtained had a solids content of 47% and was subsequently coated on to paper using a laboratory Meyer bar coater. When the sheet was placed on a colour developing sheet and written upon, a clear blue copy was developed on the colour developing sheet.

EXAMPLE IV

This illustrates the addition of melamine formaldehyde precondensate in more than one stage. The procedure was as described in Example III, except that before the ammonium chloride was added to the dispersion a further 12.0 g of BC336 precondensate diluted with 10 g of deionized water were added. The microcapsule suspension obtained had a solids content of about 44% and was subsequently coated on to paper using a laboratory Meyer bar coater. When the sheet was placed on a colour developing sheet and written upon, a clear blue copy was developed on the colour developing sheet.

EXAMPLE V 60 g of a 5% solution of an anionic starch (Viscogel C2/115 supplied by Starch Products Ltd.) were diluted with 380 g of de-ionized water and the pH of the diluted solution was adjusted to 4.3 using 15% acetic acid solution. 12.5 g of BC336 precondensate were added. The mixture was chilled to 15° C. and then stirred for 2½ hours at that temperature to bring about partial condensation, after which the mixture was milled with 248.5 g of the same internal phase as in Example I until a mean droplet size of 7μ was reached. The resulting dispersion was stable. A further 12.0 g of melamine formaldehyde precondensate, diluted with 10 g of de-ionized water, were added. 14.0 g of 25% ammonium chloride solution were then added to the dispersion which was stirred for 1 hour at room temperature. The temperature of the dispersion was then raised to 55° C. using a water bath and the dispersion was stirred for a further two hours at that temperature, after which microcapsules were seen to have formed. The pH was then raised to 10.0. The microcapsule suspension obtained had a solids content of 38% and was subsequently coated on to paper using a laboratory Meyer bar coater. When the sheet was placed on a colour developing sheet and written upon, a clear blue copy was developed on the colour developing sheet.

EXAMPLE VI

The procedure described in Example V was repeated except that 200 g of a 1% sodium alginate solution, diluted with 240 g de-ionized water, were used instead of the diluted Viscogel C2/115 solution. The microcapsule suspension obtained had a solids content of 31% and was subsequently coated on to paper using a laboratory Meyer bar coater. When the sheet was placed on a colour developing sheet and written upon, a clear blue copy was developed on the colour developing sheet.

EXAMPLE VII 101.3 g of R1144 copolymer was diluted with 343.5 g of de-ionized water, and the pH of this mixture was lowered to 4.3 using 15% acetic acid solution, after which 17.6 g of methylated melamine formaldehyde precondensate (TM10/51 supplied by Ciba-Geigy and having a reactive resin content of about 74% by weight and a solids content of about 75% by weight and a hydrophobe point of about 45° C.) were added. The mixture was stirred for 2½ hours at room temperature to bring about partial condensation, after which the mixture was milled with 248.5 g of the same internal phase as in Example 1 until a mean droplet size of 6.5µ was reached. The resulting dispersion was stable. A further 12.0 g of melamine formaldehyde precondensate, diluted with 10 g of de-ionized water, were added. 14.0 g of 25% ammonium chloride solution were then added to the dispersion, which was then stirred for 1 hour at room temperature. The temperature of the dispersion was then raised to 55° C. using a water bath and the dispersion was stirred for a further 2 hours at that temperature, after which microcapsules were seen to have formed. The pH was then raised to 10.0. The microcapsule suspension obtained had a solids content of 46% and was subsequently coated on to paper using a laboratory Meyer bar coater. When the sheet was placed on a colour developing sheet and written upon, a clear blue copy was developed on the colour developing sheet.

EXAMPLE VIII

This example illustrates preparation of microcapsules using different relative amounts of internal phase and wall material precursor (i.e. different phase ratios) to produce stable dispersions.

The procedure used was generally as described in Example IV except that prior to the milling step, different quantities of internal phase and wall material precursors were used as shown below:

| Wt. of R1144 (g) | Wt. of BC336 (g) | Total Wt. of R1144 and BC336 (g) - A | Wt. of Internal Phase - B | Phase Ratio (B/A) |
|---|---|---|---|---|
| 45.0 | 12.5 | 57.5 | 213 | 12.1 |
| 45.0 | 12.5 | 57.5 | 231 | 13.1 |
| 45.0 | 12.5 | 57.5 | 248.5 | 14.1 |
| 45.0 | 12.5 | 57.5 | 266 | 15.1 |
| 45.0 | 12.5 | 57.5 | 284 | 16.1 |
| 45.0 | 12.5 | 57.5 | 302 | 17.1 |
| 45.0 | 12.5 | 57.5 | 319.5 | 18.1 |

The amount of de-ionized water mixed with the R1144 copolymer was chosen to give a solids content of 55% in each case. A stable dispersion was obtained in each case.

The second addition of BC336 was adjusted to provide a final internal phase/wall material precursor ratio of 9.5:1, which is similar to that in Example IV.

The microcapsule suspensions obtained had a solids content of 44% in each case, and were coated on to paper and tested as described in Example IV, with the same result.

EXAMPLE IX

The example illustrates the production of microcapsules using different ratios of water-soluble polymer to melamine formaldehyde precondensate.

The procedure was as described in Example III except that the quantities of R1144 copolymer and BC336 precondensates used were as shown below (the adjustment of quantities of de-ionized water and internal phase was such as to maintain the % solids and internal phase/wall material precursor ratios roughly constant and as in Example III).

| Wt. of R1144 (g) A | Wt. of de-ionized water (g) | Wt. of BC336 (g) (B) | Wt. of Internal phase (g) | Ratio A/B (approx) |
|---|---|---|---|---|
| 30.0 | 193.5 | 12.5 | 206.5 | 1:1.5 |
| 45.0 | 226.5 | 12.5 | 248.5 | 1:1.0 |

Microcapsules were obtained in all cases and were coated on to paper and tested as described in Example III, with the same result.

EXAMPLE X

The procedure in Example IV was repeated except that the amount of BC336 precondensate added in the second addition was 20 g. This gave a solids content of 47%. Microcapsules were obtained and were coated on to paper and tested as described in Example IV, with the same result.

EXAMPLE XI

The procedure of Example III was repeated except that different pH values were employed as follows: 3.7, 3.9, 4.1, 4.3, and 4.5. Stable dispersions of internal phase were obtained in every case, and microcapsules were made successfully in every case and were tested as described in Example III, with the same result.

EXAMPLE XII

This Example demonstrates that the order of addition of the various reactants is not critical.

The reactants used and the quantities employed were as in Example III. The de-ionized water was added to the BC336 precondensate, and the R1144 copolymer was then added. The pH was then adjusted to 4.3 and the procedure was otherwise as described in Example III. Microcapsules were obtained and were coated on to paper as described in Example III, with the same result.

EXAMPLE XIII

This illustrates the encapsulation of a different internal phase from that used in the previous Examples and demonstrates that the present process can encapsulate liquids which are oily, but have significant polar character. This internal phase was a 4.5:1.1:1.0 (w/w) mixture of cyclo-hexane, diethylphthalate and tributylphosphate containing, as colour formers, 4.2% N,N'-bis(2-octanoyloxyethyl)di-thio-oxamide and 1.6% dibenzyl-dithio-oxamide. 22.5 g of R1144 copolymer, 6.25 g of BC336 precondensate, and 113.25 g of de-ionized water were mixed and the pH of the mixture was lowered to 4.3 by adding 15% dilute acetic acid solution. The mixture was stirred until its turbidity was such that it transmitted only 70% of light incident to it (as measured according to manufacturers' instructions using a Bausch and Lomb "Spectronic 20" spectrophotometer), showing that partial condensation had occurred. 124.25 g of internal phase were added to the mixture, which was then milled until a mean droplet size of 2μ was reached. A stable dispersion was achieved.

6 g of BC336 were diluted with 5.0 g of water and added to the dispersion. 7.0 g of 25% ammonium chloride solution were then added and the resulting mixture was stirred at 20° C. for 1 hour. The temperature of the mixture was then raised to 55° C. using a water bath and stirring was continued for a further 2 hours, after which microcapsules were seen to have formed. The pH was then raised to 10.0.

The microcapsule suspension obtained had a solids content of 40% and was coated on to paper using a laboratory Meyer bar coater. Oily smears were absent, showing that there was no significant leakage of internal phase from the microcapsules. When the sheet was placed on a colour developing sheet and written upon, a clear blue copy was developed on the colour developing sheet.

EXAMPLE XIV

THis example illustrates the use of the present process on a pilot plant scale. 45 Kg of R1144 copolymer and 229 Kg of de-ionized water were mixed and the pH of the mixture was adjusted to 4.3 using 20% acetic acid solution (20 Kg). 12.5 Kg of BC336 precondensate were added and the resulting mixture was chilled to 15° C. and stirred at that temperature for 2 hours. When the turbidity of the stirring mixture was such that it transmitted only 85% of light incident to it (measured as described in the previous Example), 248.5 Kg of internal phase were added to the mixture which was then milled until a mean droplet size of 7μ was reached. A stable dispersion was obtained.

22 Kg of BC336 solution and 14 Kg of 25% ammonium chloride solution were added and the mixture was stirred for 1 hour at 15° C. The temperature of the dispersion was then raised to 55° C. and stirring was carried out for a further 2 hours, after which microcapsules were seen to have been formed. The pH of the microcapsules suspension was then raised to 10.0 using 25% sodium hydroxide solution (30 Kg). The microcapsule suspension had a solids content of 45%, and was air-knife coated on to paper on a pilot plant coater. When a sheet of the resulting coated paper was placed on a colour developing sheet and written upon, a clear blue copy was obtained on the colour developing sheet.

EXAMPLE XV

This illustrates the encapsulation of a further range of different internal phases, namely:
(a) Di-octyl phthalate (DOP)
(b) 2:1 mixture of DOP and kerosene
(c) Di-isobutyl phthalate (DIBP)
(d) 2:1 mixture of DIBP and kerosene
(e) 2:1 mixture of a phosphate ester and kerosene (the phosphate ester was that sold as Santicizer 148 by Monsanto).

These liquid fill materials did not contain dissolved colour formers.

The quantities used and encapsulation procedure employed were as described in Example IV.

The microcapsule suspensions obtained were coated on to paper using a laboratory Meyer bar coater. Oily smears were absent, showing that there was no significant leakage of internal phase from the microcapsules.

EXAMPLE XVI 75 g of a 10% CMC solution (Finnfix 5 supplied by Price and Pierce) were diluted with 275 g of de-ionized water and the pH of the diluted solution was adjusted to 4.6 using 15% acetic acid solution. 11 g of BC336 precondensate which had been diluted with 11 g of de-ionized water were added. The mixture, which was initially clear, was stirred at room temperature until it became just turbid, showing that partial condensation had occurred, after which the mixture was milled with 200 g of the same internal phase as in Example 1, until a mean droplet size of 6μ was reached. The resulting dispersion was stable and 14.0 g of 25% ammonium chloride solution were added, after which the dispersion was stirred for 1 hour at room temperature. The temperature of the dispersion was then raised to 55° C. using a water bath and the dispersion was stirred for 1 hour at that temperature. A further 10 g of BC336 diluted with 10 g of de-ionized water were added to the dispersion and the temperature was maintained at 55° C. for a further ½ hour, after which microcapsules were seen to have formed and the pH was raised to 10.0.

The microcapsule suspension obtained had a solids content of 35.4% and was subsequently coated on to paper using a laboratory Meyer bar coater. When the sheet was placed on a colour developing sheet and written upon, a clear blue copy was developed on the colour developing sheet.

EXAMPLE XVII

The procedure described in Example XVI was repeated except that 200 g of a 1% HEC solution (Natrosol M supplied by Hercules Powder Corporation) diluted with 200 g de-ionized water, were used instead of the diluted CMC solution.

During the period the dispersion was held at 55° C., dilution was carried out to reduce viscosity. The microcapsule suspension had a solids content of 28.7% and was tested, as described in Example XVI, with the same result.

EXAMPLE XVIII

The procedure described in Example V was repeated, except that 100 g of a 5% neutral starch solution (Stayco S supplied by Staley), diluted with 360 g of de-ionized water, were used instead of the diluted Viscogel C2/115 solution. During the period the dispersion was held at 55° C., dilution was carried out to reduce viscosity. The microcapsule suspension had a solids content of 27.4% and was tested as described in Example XVI with the same result.

EXAMPLE XIX 45 g of R1144 copolymer were diluted with 225 g de-ionized water and the pH of the mixture was lowered to 4.5 by adding 20% acetic acid. 22 g of melamine formaldehyde precondensate (Parez 613 supplied by American Cyanamid Company and having a solids content of about 80% by weight and a hydrophobe point of above 90 C) were added. The mixture was milled immediately with 250 g of internal phase until a mean droplet size of $5\mu$ was reached. The dispersion thus formed was found to be stable.

The dispersion was then stirred for 1 hour at 15° C. The temperature of the dispersion was then raised to 55° C. using a water bath and the dispersion was left stirring for a further 2 hours at that temperature, after which microcapsules were seen to have formed. The pH of the mixture was then raised to 10.0 with sodium hydroxide solution. The microcapsule suspension obtained had a solids content of 50.0% and was subsequently coated on to paper using a laboratory Meyer bar coater. When the sheet was placed on a colour developing sheet and written upon, a clear blue copy was developed on the colour developing sheet.

EXAMPLE XX

This illustrates the addition of melamine formaldehyde precondensate in two stages. 45 g of R1144 copolymer were diluted with 225 g of de-ionized water and the pH of the mixture was lowered to 4.5 by adding 20% acetic acid 11 g of Parez 613 were added. The mixture was milled immediately with 250 g of internal phase until a mean droplet size of $6\mu$ was reached. The resulting dispersion was stable. 20.0 g of 25% ammonium sulphate solution was added to the dispersion, followed by a further 11.0 g of Parez 613 which had previously been diluted with 11.0 g of de-ionized water. The resulting mixture was then stirred for 1 hour at room temperature.

The temperature of the dispersion was raised to 60° C. using a water bath and the dispersion was stirred for 2 hours at that temperature, after which microcapsules were seen to have formed. The pH was then raised to 10.0. The microcapsule suspension obtained had a solids content of 48% and was subsequently coated on paper using a laboratory Meyer bar coater. When the sheet was placed on a colour developing sheet and written upon, a clear blue copy was developed on the colour developing sheet.

EXAMPLE XXI

The procedure used in Example XIX was adopted, except that a 2:1 mixture of DOP and kerosene were used as internal phase. This liquid fill material did not contain dissolved colour formers.

The microcapsule suspension obtained was coated on to paper using a laboratory Meyer bar coater. Oily smears were absent, showing that there was no significant leakage of internal phase from the microcapsules.

EXAMPLE XXII 75 g of a 10% C.M.C. (Finnfix 5) solution were diluted with 225 g of de-ionized water. 11 g of Parez 613 melamine formaldehyde precondensate were added. The pH of the resultant mixture was adjusted to 4.7 using 20% acetic acid. The mixture was milled immediately with 250 g of internal phase until a mean droplet size of $7\mu$ was reached. The resulting dispersion was stable and was stirred for 1 hour at room temperature. 20.0 g of 25% ammonium chloride were added to the dispersion, after which the temperature of the mixture was raised to 55° C. using a water bath. The dispersion was stirred for 1 hour at 55° C. During this period 100 g de-ionized water were added to the dispersion to reduce viscosity. A further 11 g of Parez 613 diluted with 11 g of de-ionized water were added to the dispersion and the temperature was maintained at 55° C. for a further ¾ hour, after which microcapsules were seen to have formed and the pH was raised to 10.0.

The microcapsule suspension obtained had a solids content of 34% and was subsequently coated on to paper using a laboratory Meyer bar coater. When the sheet was placed on a colour developing sheet and written upon, a clear blue copy was developed on the colour developing sheet.

EXAMPLE XXIII

The procedure in Example XIX was repeated, except the following melamine formaldehyde precondensates were used as replacements for Parez 613:

(i) 22 g of Sumirez 613 (supplied by Nagase and Company Ltd., of Japan and having a solids content of about 80% and a hydrophobe point of above 90° C.)

(ii) 24 g of BC 371 (supplied by British Industrial Plastics Ltd. and having a solids content of about 77% and a hydrophobe point of above 90° C.).

(iii) 24 g of BC 309 (supplied by British Industrial Plastics Ltd. and having a solids content of about 80% and a hydrophobe point of above 90° C.)

(iv) 22 g of Parez 707 (also supplied by American Cyanamid Company and having a solids content of about 80% and a hydrophobe point of above 90° C.)

In each case, microcapsule suspensions were produced which were subsequently coated on to paper using a laboratory Meyer bar coater. When the sheet was placed on a colour developing sheet and written upon, a clear blue copy was developed on the colour developing sheet.

EXAMPLE XXIV 10 g of BC 336 precondensate were added to 150 g of a 10% solution of polyethylene oxide ("WSRN 10" supplied by Union Carbide) and the pH of the resulting mixture was adjusted to 4.3 using dilute acetic acid. The mixture was then warmed with stirring until it became turbid. 50 g of de-ionized water were then added, followed by 150 g of internal phase. The mixture was milled until a mean droplet size of $10\mu$ was reached. The dispersion was stirred for ½ hour and then heated to 55° C. and maintained at that temperature for two hours. The pH was then raised to 10. The microcapsule dispersion obtained had a solids content of about 39% and was coated on to paper using a laboratory Meyer bar coater. When the thus coated sheet was placed on a colour developing sheet and written upon, a clear blue copy was developed on the colour developing sheet.

EXAMPLE XXV

A mixture was prepared, consisting of 5.5 g BC336, 2.2 g Nadavin (Polyamide solution supplied by BASF) and 100 g. de-ionized water. The pH of the mixture was adjusted to 4.1 using dilute acetic acid and the mixture was heated at 40° C. until milky in appearance. 200 g de-ionized water were then added, and 30 g of the same internal phase as used in Example 1 were dispersed in the mixture to give a stable dispersion of mean droplet size 10 μm. The dispersion was stirred at room temperature for 1 hour, then the temperature was raised to 50° C. After 2 hours at the elevated temperature, capsules had been produced. The pH of the microcapsule disperson was adjusted to pH 7 using sodium hydroxide solution. The microcapsule suspension obtained was subsequently coated onto a paper using a laboratory Meyer Bar coater. When this sheet was placed on a colour developing sheet and written upon, a clear blue copy was developed on the colour developing sheet.

EXAMPLE XXVI 40 g of Accostrength 72 (Acrylic acid/acrylamide copolymer solution supplied by American Cyanamid Company) were diluted with 260 g de-ionized water and the pH was adjusted to 4.5 using dilute acetic acid.

20 g of BC336 precondensate were then added and the mixture was stirred at 45° C. for about 30 minutes until the mixture became milk-white in appearance.

200 g of the same internal phase as used in Example 1 were then added and the mixture was milled to give a stable dispersion of mean droplet size 10 μm. The dispersion was then stirred for 1 hour at room temperature, then stirred for 2 hours at 55°. The microcapsule suspension obtained had a solids content of about 43% by weight and was subsequently coated onto paper using a laboratory Meyer bar coater. When this sheet was placed on a colour developing sheet and written upon, a clear blue copy was developed on the colour developing sheet.

EXAMPLE XXVII

A mixture was prepared, consisting of 6 g BC336, 2 g Niax PPG 425 (Polypropylene glycol supplied as a liquid by Hythe Chemicals Ltd) and 100 g de-ionized water. The pH of the mixture was adjusted to 4.3 using dilute acetic acid and the mixture was heated at 40° C. until milky in appearance. 250 g de-ionized water were then added, and 50 g of the same internal phase as used in Example 1 were dispersed in the mixture to give a stable dispersion of mean droplet size 9 μm. The dispersion was stirred at room temperature for 1 hour, then the temperature was raised to 50° C. After 2 hours at the elevated temperature capsules had been produced. The pH of the microcapsule dispersion was adjusted to pH 7 using sodium hydroxide solution. The microcapsule suspension obtained was subsequently coated on to paper using a laboratory Meyer Bar coater. When this sheet was placed in a colour developing sheet and written upon, a clear blue copy was developed on the colour developing sheet.

EXAMPLE XXVIII 50 g of R114 copolymer were diluted with 320 g de-ionized water and the pH was adjusted to 4.3 using dilute acetic acid.

70 g of BC336 precondensate were than added and the mixture was stirred at 45° C. for about 30 minutes until the mixture became milk-white in appearance.

200 g of the same internal phase as used in Example 1 were then added and the mixture was milled to give stable dispersion of mean droplet size 5 μm. The dispersion was then stirred for 1 hour at room temperature, then stirred for 2 hours at 55°. The microcapsule suspension obtained had a solids content of about 41% by weight and was subsequently coated on to paper using a laboratory Meyer bar coater. When this sheet was placed on a colour developing sheet and written upon, a clear blue copy was developed on the colour developing sheet.

EXAMPLE XXIX 10 g of BC336 precondensate were diluted with 50 g de-ionized de-ionized water and the pH of the resulting mixture was adjusted to pH 4.3 using dilute acetic acid. 2.2 g of a liquid polyquaternaryamine (ACCURAC 41, supplied by American Cyanamid Company) were then added and the mixture was stirred while being heated in a waterbath to 50° C. After about 25 minutes the mixture became milky-white in appearance and was removed from the waterbath and 220 g deionized water were added. 50 g of the same internal phase as was used in example 1 were then added and milling was carried out until a mean droplet size of 10 μm was reached. The resulting dispersion was stable, and was left stirring for 1 hour at room temperature. The temperature was then raised to 55° C. and after 2 hours at that temperature, microcapsules were seen to have been formed. Dilute Sodium hydroxide solution was then added to raise the pH to 10. The microcapsule suspension obtained was subsequently coated once paper using a laboratory Meyer Bar coated. When this sheet was placed on a colour developing sheet and written upon, a clear blue copy was developed on the colour developing sheet.

EXAMPLE XXX 45 g R1144 were diluted with 200 g de-ionized water and the pH was adjusted to 4.5 2.8 g of Parez 707 precondensate were added whilst stirring. 260 g of the same internal phase as used in example 1 were added and the mixture was milled to give a stable emulsion of mean droplet size 6 μm. After stirring for one hour at room temperature, the dispersion was heated to 55° C. and stirred for 2 hours, during which, microcapsules were formed. The pH of the microcapsule dispersion was adjusted to pH 10. The microcapsule suspension obtained was subsequently coated on to paper using a laboratory Meter Bar coater. When this sheet was place on a colour developing sheet and written upon, a clear blue copy was developed on the colour developing sheet.

EXAMPLE XXXI 50 g of 2.5% Manucol Ester solution (Manucol ester is supplied by Alginate Industries Ltd) was added, with stirring, to 200 g de-ionized water. The resulting pH was approximately pH 4.3. 10 g BC336 precondensate were then added and the mixture was heated until it became milk-white in appearance (after about 25 minutes) 80 g of the same internal phase as used in Example 1 were added and the mixture was milled to give a stable dispersion of means droplet size 14 μm . After stirring for 1 hour at room temperature, the dispersion was heated at 60° C. for 2 hours. The microcapsule dispersion was then adjusted to pH 10 using dilute sodium hydroxide solution. The capsule dispersion had a solids content of about 25% solids and was subsequently coated on to paper using a laboratory Meyer bar coater. When this sheet was placed on a colour developing sheet and written upon, a clear blue copy was developed on the colour developing sheet.

EXAMPLE XXXII 8 g of a water soluble polyurethane (CYCLOPAL KE, supplied as an aqueous solution at 15% solids by AKZO Chemie) was added to 100 g de-ionized water and the pH was adjusted to 4.3 using dilute acetic acid. 8 g BC336 precondensate were added and the mixture was stirred at 30° C. until it became milk-white in appearance. 400 g de-ionized water were then added and 30 g of the same internal phase as was used in Example 1 were dispersed in the mixture to give a stable dispersion of mean droplet size 10 µm.

After stirring for 1 hour at room temperature, the mixture was stirred at 55° C. for two hours and then sodium hydroxide solution was added to give pH 10. The microcapsule suspension obtained was subsequently coated on to paper using a laboratory Meyer bar coater. When this sheet was placed on a colour developing sheet and written upon, a clear blue copy was developed on the colour developing sheet.

EXAMPLE XXXIII

A mixture was prepared, consisting of 8 g BC336, 1.7 g Kymene 557 (Polyamide polyamine epichlorohydrin resin supplied at 10% solids by Hercules Ltd) and 100 g de-ionized water. The pH of the mixture was adjusted to 4.1 using dilute acetic acid and the mixture was heated at 40° C. until milky in appearance.

450 g de-ionized water were then added, and 60 g of the same internal phase as used in Example 1, were dispersed in the mixture to give a stable dispersion of mean droplet size 8 µm. The dispersion was stirred at room temperature for 1 hour, then the temperature was raised to 50° C. After 2 hours at the elevated temperature, capsules had been produced. The pH of the microcapsule dispersion was adjusted to pH7 using sodium hydroxide solution. The microcapsule suspension obtained was subsequently coated on to paper using a laboratory Meyer bar coater. When this sheet was placed on a colour developing sheet and written upon, a clear blue copy was developed on the colour developing sheet.

EXAMPLE XXXIV 21 g of Polymin SN (Polyethyleneimine solution supplied by BASF) were diluted with 100 g de-ionized water and the pH was adjusted to 4.1 using dilute acetic acid.

9.7 g of BC 336 precondensate were then added and the mixture was stirred at 45° C. for about 30 minutes until the mixture became milk-white in appearance.

100 g of the same internal phase as used in Example 1 were then added and the mixture was milled to give a stable dispersion of mean droplet size 8 µm. The dispersion was then stirred for 1 hour at room temperature, then stirred for 2 hours at 55°. The microcapsule suspension obtained had a solids content of about 48% by weight and was subsequently coated on to paper using a laboratory Meyer bar coater. When this sheet was placed on a colour developing sheet and written upon, a clear blue copy was developed on the colour developing sheet.

EXAMPLE XXXV 60 g of a 0.5% solution of Xanthan Gum (BIOZAN, supplied by Hercules) was diluted with 120 g de-ionized water. The pH of the solution was found to be 4.1. 9.1 g BC336 precondensate were added and the mixture was heated at 50° C. for 20 minutes. 50 g Internal phase (as used in example 1) were added and the mixture was milled to give a stable dispersion of mean droplet size 10 µm.

The dispersion was then stirred at room temperature for 1 hour, and at 55° C. for two hours, then adjusted to pH 10 using sodium hydroxide solution. The resulting microcapsule suspension had a solids content of 30% and was subsequently coated on to paper using a laboratory Meyer bar coater. When this sheet was placed on a colour developing sheet and written upon, a clear blue copy was developed on the colour developing sheet.

EXAMPLE XXXVI 75 g of a 15% carboxymethylcellulose solution (BLANOSE 7L1 supplied by Hercules) were diluted with 275 g de-ionized water and the pH of the solution was adjusted to 4.6 using 15% acetic acid solution. 11 g of BC336 precondensate which had been diluted with 11 g of de-ionized water were added. The mixture was stirred at 45° C. for about 30 mins until it became milk white in appearance, after which the mixture was milled with 150 g of the same internal phase as in Example 1, until a mean droplet size of 10 µm was reached.

A further 10 g of BC 336 precondensate was added, and the stable dispersion was stirred for 1 hour at room temperature. The temperature was then raised to 55° C. and the dispersion was stirred for 2 hours, the pH then being raised to 10 using dilute sodium hydroxide solution. The microcapsule suspension obtained was subsequently coated on to paper using a laboratory Meyer bar coater. When this sheet was placed in a colour developing sheet and written upon, a clear blue copy was developed on the colour developing sheet.

None of the materials used in the Examples were found to be adequately dispersion stabilising by themselves in the aqueous media in which they were used.

I claim:

1. A process for the production of microcapsules containing a liquid fill material, comprising the steps of:
    establishing an aqueous medium which is at an acidic pH and which contains both a melamine formaldehyde precondensate condensable at said acidic pH and a polymer which contains at least one acid, amide, amine, imine, ester, ether, hydroxyl, urethane, thiol or mercaptan group, said melamine formaldehyde precondensate interacting with said polymer in the absence of any substantial amount of urea formaldehyde precondensate to form a species which imparts dispersion-stabilizing properties to the liquid fill material, neither said melamine formaldehyde precondensate nor said polymer alone being dispersion-stabilizing with respect to the liquid fill material at the conditions at which a stable dispersion is to be established;
    establishing a stable dispersion of liquid fill material in the aqueous medium after formation of said dispersion stabilizing species; and
    condensing said melamine formaldehyde precondensate by acid catalysis after formation of said dispersion to produce a melamine formaldehyde condensate which separates from solution and enwraps the dispersed liquid fill to produce said microcapsules.

2. A process according to claim 1 wherein said melamine formaldehyde precondensate is a methylated melamine formaldehyde precondensate.

3. A process as claimed in claim 1 wherein said water soluble polymer is an acrylamide/acrylic acid copolymer, starch or a starch derivative, hydroxyethyl cellulose carboxymethyl cellulose, an alginate, a polyurethane, polyethylene oxide, polypropylene glycol, a polyquaternary amine, a polyamide polyamine epichlorohydrin resin, polyethyleneimine or xanthan gum.

4. A process as claimed in any preceding claim wherein said acidic pH is in the range 3.9 to 5.5.

5. A process as claimed in any of claims 1, 2 or 3 where the precondensate is partially condensed in the presence of the polymer to produce the dispersion stabilising species.

6. A process as claimed in any of claims 1, 2 or 3 wherein the dispersion stabilising species is formed without initial partial condensation in the presence of the polymer.

7. A process as claimed in any of claims 1, 2 or 3 wherein the weight ratio of said polymer to said precondensate is in the range 0.03:5 to 5:1.

8. A process as claimed in any of claims 1, 2 or 3 wherein once a stable dispersion has formed the temperature is raised to accelerate the condensation reaction.

9. A process as claimed in any of claims 1, 2 or 3 wherein the weight ratio of liquid fill material droplets to microcapsule wall precursor material in aqueous acidic medium is in the range of 4.5:1 to 20:1.

10. A process as claimed in any of claims 1, 2 or 3 wherein additional melamine formaldehyde precondensate is added after formation of a stable dispersion.

11. Microcapsules produced by a process as claimed in any of claims 1, 2 or 3.

12. A sheet material carrying microcapsules as claimed in claim 11.

* * * * *